(12) United States Patent
Haveman et al.

(10) Patent No.: US 11,365,052 B2
(45) Date of Patent: Jun. 21, 2022

(54) AUTOMATED GUIDED VEHICLE AND METHOD OF USE

(71) Applicant: Oceaneering International, Inc., Houston, TX (US)

(72) Inventors: Steven Haveman, Houston, TX (US); Joel Nap, Houston, TX (US)

(73) Assignee: Oceaneering International, Inc., Houston, TX (US)

( * ) Notice: Subject to any disclaimer, the term of this patent is extended or adjusted under 35 U.S.C. 154(b) by 0 days.

(21) Appl. No.: 16/870,407

(22) Filed: May 8, 2020

(65) Prior Publication Data

US 2020/0270063 A1 Aug. 27, 2020

Related U.S. Application Data

(62) Division of application No. 15/878,879, filed on Jan. 24, 2018, now abandoned.

(51) Int. Cl.
| | |
|---|---|
| *B65G 1/137* | (2006.01) |
| *G05D 1/00* | (2006.01) |
| *G05D 1/02* | (2020.01) |
| *B66F 9/24* | (2006.01) |
| *B66F 9/075* | (2006.01) |
| *B66F 9/06* | (2006.01) |

(52) U.S. Cl.
CPC .............. *B65G 1/137* (2013.01); *B66F 9/063* (2013.01); *B66F 9/0755* (2013.01); *B66F 9/24* (2013.01); *G05D 1/0088* (2013.01); *G05D 1/0225* (2013.01); *G05D 1/0285* (2013.01); *G05D 1/0291* (2013.01); *B65G 2201/0235* (2013.01); *B65G 2201/0267* (2013.01); *G05D 2201/0216* (2013.01)

(58) Field of Classification Search
CPC ......... G05D 2201/0216; G05D 1/0027; G05D 1/0297; G05D 10/20; B65G 1/10; B65G 1/1378; B65G 1/137; B65G 1/1371; B65G 1/0492; G06Q 10/08; G05B 19/41895

See application file for complete search history.

(56) References Cited

U.S. PATENT DOCUMENTS

2018/0127212 A1* 5/2018 Jarvis .................. G05D 1/0234

* cited by examiner

*Primary Examiner* — Timothy R Waggoner
(74) *Attorney, Agent, or Firm* — Maze IP Law, P.C.

(57) ABSTRACT

A storage system comprises one or more automated guided vehicles, one or more centralized supervisory systems, one or more parts container storage spaces disposed within a defined two dimensional space comprising one or more addressable parts container spaces and parts bins which comprise a part identifier and which are configured to fit at least partially within the parts container storage space. The automated guided vehicles comprise a controllable autonomous parts container base and one or more position sensors operatively in communication with a controller and operative to determine a coordinate location of the automated guided vehicle within a defined two dimensional space in real time without relying on a map stored in the controller.

11 Claims, 6 Drawing Sheets

US 11,365,052 B2

AUTOMATED GUIDED VEHICLE AND METHOD OF USE

RELATION TO OTHER APPLICATIONS

This application is a divisional application of U.S. application Ser. No. 15/878,879 filed on Jan. 24, 2018 and claims priority from U.S. Provisional Application 62/449,941 titled "Automated Forklift System" and filed on Jan. 24, 2017.

FIELD OF THE INVENTION

Automated guided vehicles (AGVs) are typically self-powered, self-driven vehicles used to transport material and other items from one location to another without any accompanying operator. Traditional AGV systems comprise a centralized computer system which is in contact with one or more AGVs deployed in a facility. In certain AGV systems, this controller can be a single, centralized one or dispersed in a decentralized manner.

BACKGROUND

Automated guided vehicles (AGVs) are typically self-powered, self-driven vehicles used to transport material and other items from one location to another without any accompanying operator. Traditional AGV systems comprise a centralized computer system which is in contact with one or more AGVs deployed in a facility. In certain AGV systems, this controller can be a single, centralized one or dispersed in a decentralized manner.

DRAWINGS

The figures supplied herein illustrate various embodiments of the invention. Items not expressly illustrated in the drawings are not necessary for the understanding of the subject matter sought to be patented by one of ordinary skill in these arts.

BRIEF DESCRIPTION OF EXEMPLARY EMBODIMENTS

Figure 1:
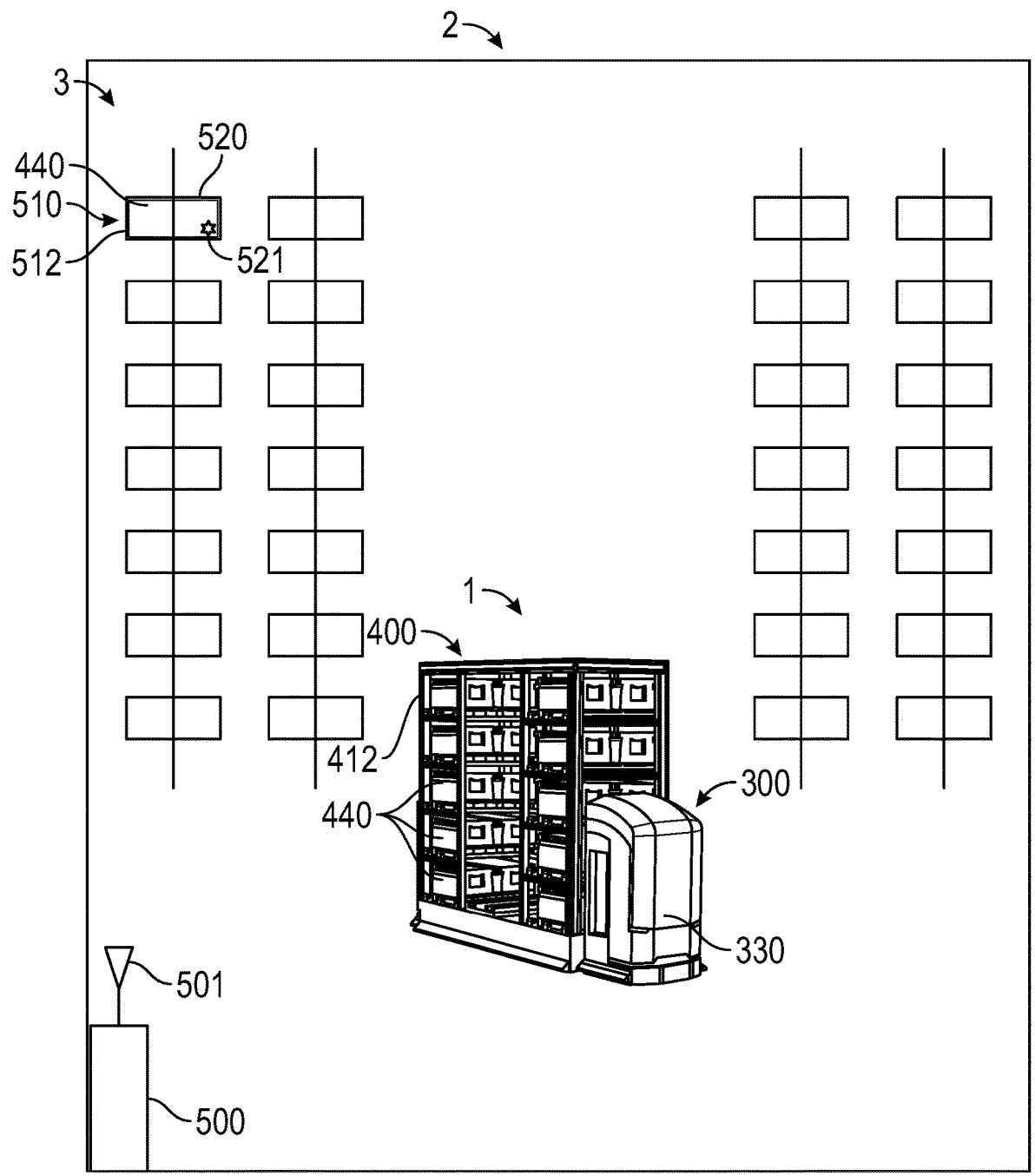
FIG. 1 is a schematic diagram of an exemplary system.

Referring to FIG. 1, storage system 2 comprises one or more automated guided vehicles 1, which are as described below; one or more centralized supervisory systems 500; one or more parts container storage spaces 510, each parts container storage space 510 comprising one or more individually addressable parts container spaces 512 disposed within a defined two dimensional space 3; one or more parts bins 520, each parts bin 520 comprising part identifier 521 which can be an optical, electromagnetic, or similar device, where parts bins 520 are configured to fit at least partially within addressable parts container spaces 512; and software operatively executable in controller 500. A plurality of addressable parts container spaces 512 may stacked, e.g. vertically, within one container storage space 510. Each parts bin 520 can contain a removable part container 440.

Centralized supervisory system 500 typically comprises a processor and a supervisory system transceiver operatively in communication with the processor.

Figure 7:
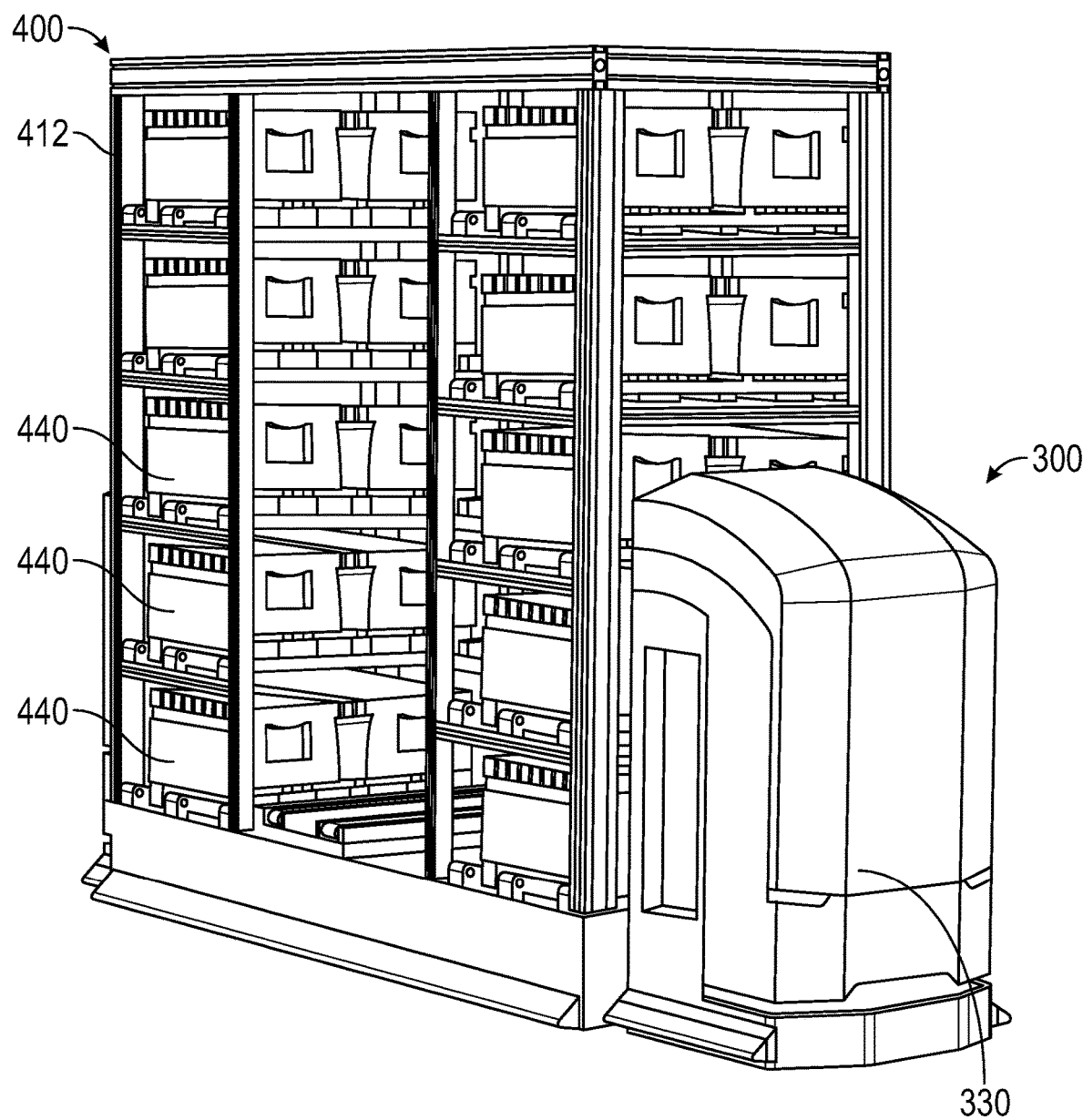
FIG. 7 is a further view in partial perspective of the third exemplary automated guided vehicle.
Figure 8:
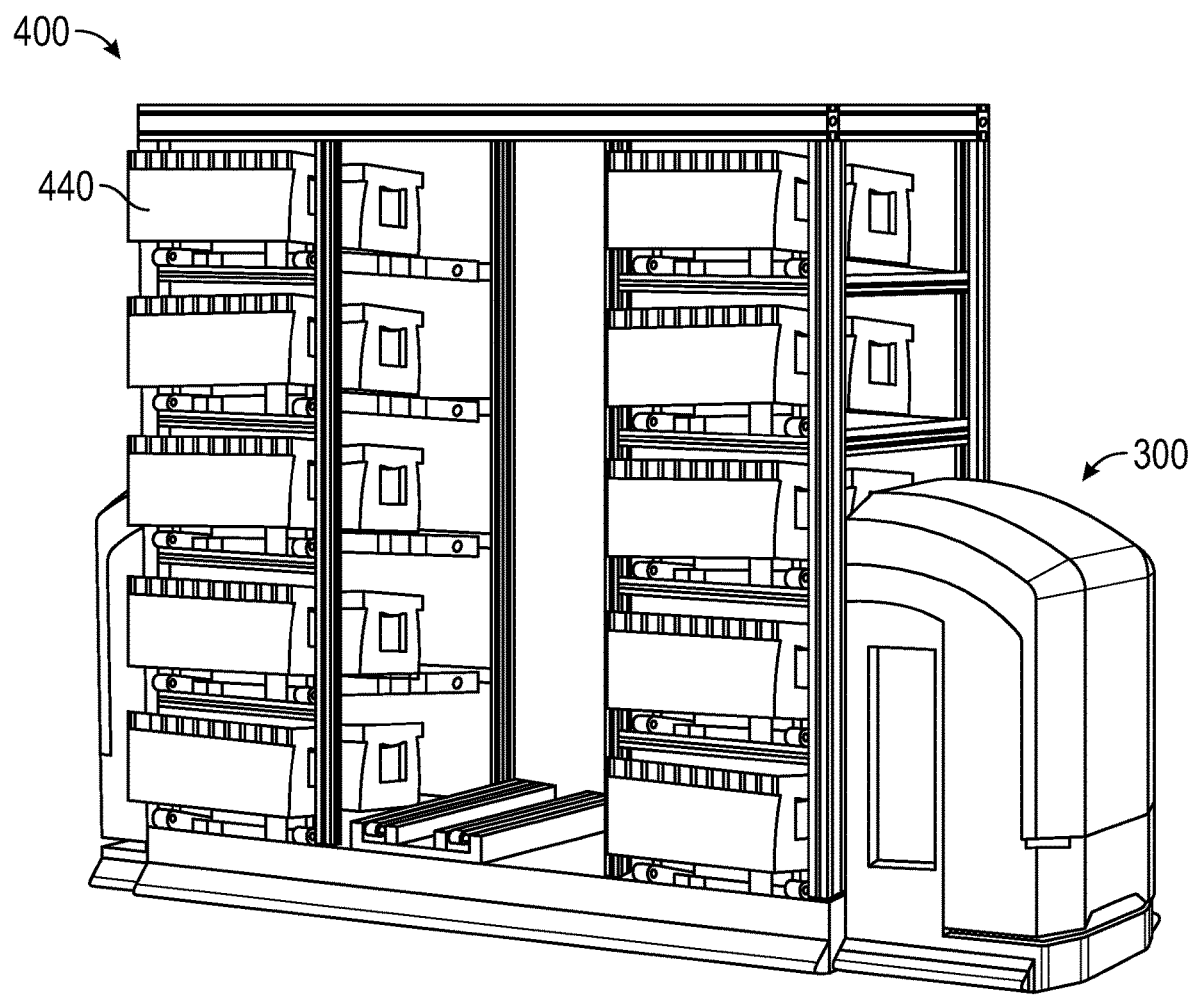
FIG. 8 is a further view in partial perspective of the third exemplary automated guided vehicle.

The software operatively executable in controller 500 typically comprises a location module adapted to identify a real-time location of each controllable autonomous parts container base (illustrated in FIG. 2 as 100,200,300 and discussed below) in two dimensional space 3; a motive assembly module adapted to provide a set of navigation commands to each controllable autonomous parts container base 100,200,300 in two dimensional space 3 in real time; a parts container module adapted to identify each parts bin 520 using its parts bin identifier 521 and to provide a set of commands to each part container handler such as 230 (FIG. 5) or 330 (FIG. 7) to perform a predetermined function with respect to the identified parts bin 520. Parts bin identifier 521 may be internal (e.g., applied on) or internal (e.g. embedded in) to parts bin 520.

Figure 2:
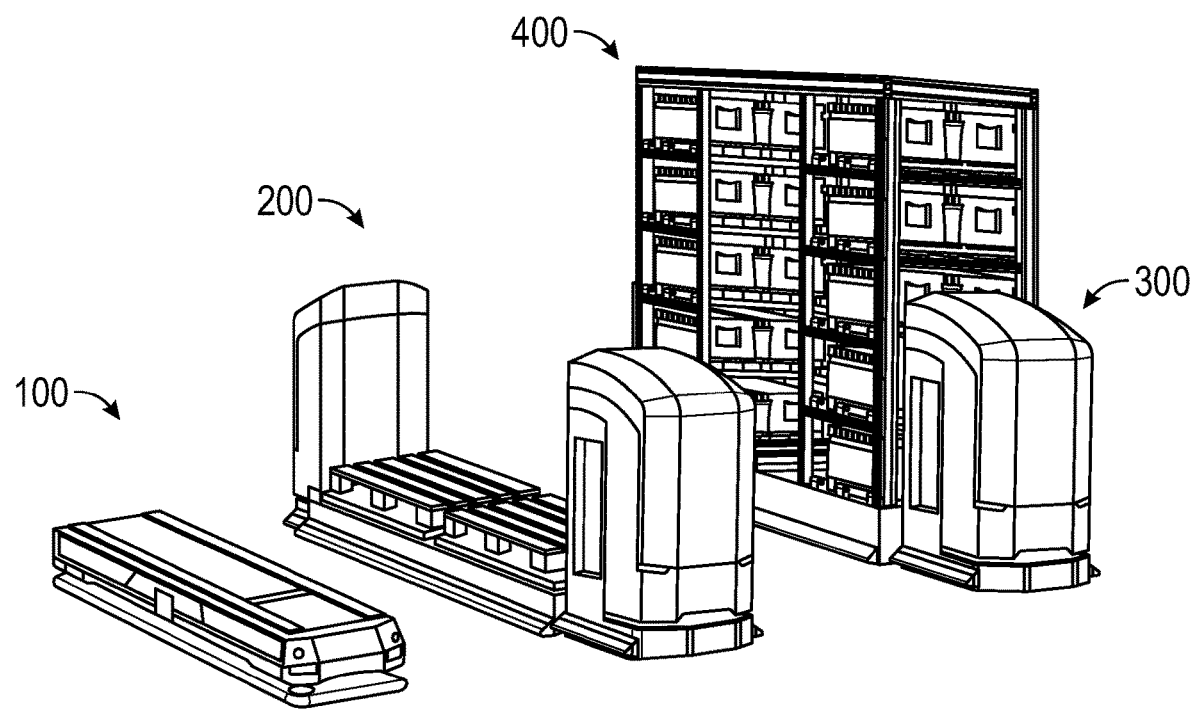
FIG. 2 is a view in partial perspective of three exemplary automated guided vehicles.

Referring now to FIG. 2, automated guided vehicle 1 comprises controllable autonomous parts container base, illustrated in FIG. 2 as embodiments 100, 200, and 300 which are explained below, one or more part container storage space receivers 110 (FIG. 4), 210 (FIG. 5), 310 (FIG. 6) disposed about predefined portion of controllable autonomous parts container base 100, 200, 300 and operatively in communication with controller 340 (FIGS. 3A and 3B), and one or more part container identifiers 380 (FIGS. 3A and 3B) operatively in communication with controller 340.

Figure 3A:
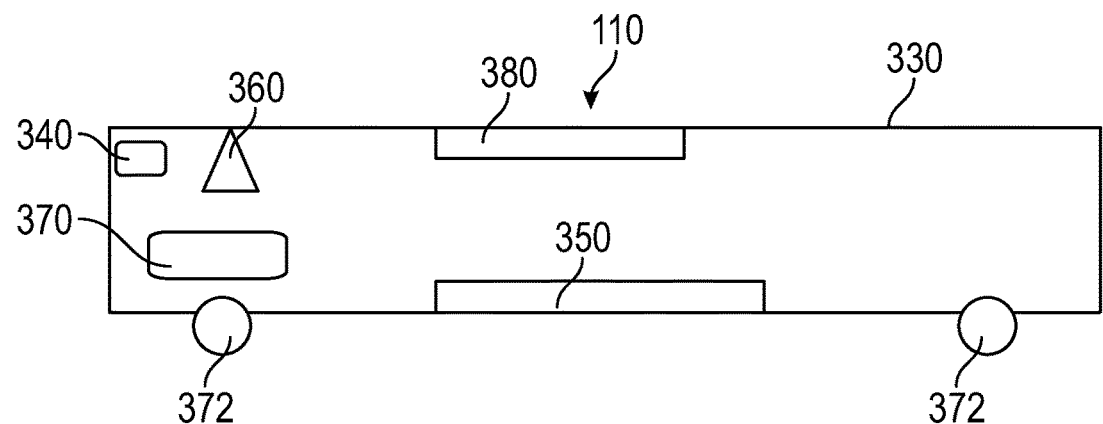
FIG. 3A is a block diagram of an exemplary automated guided vehicle illustrating various controls.
Figure 3B:
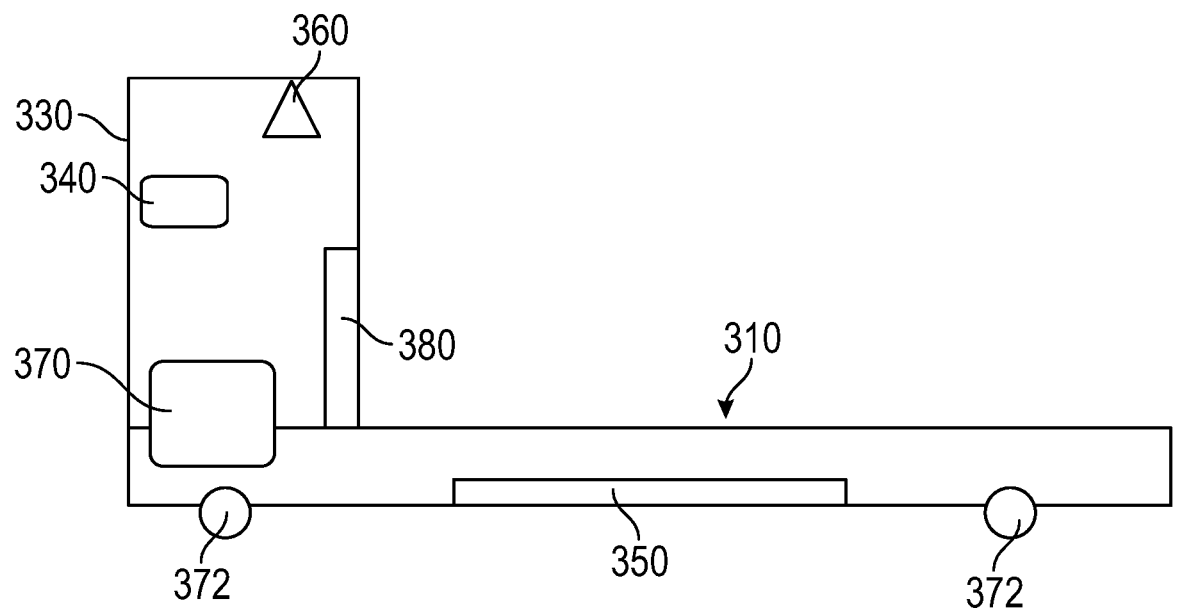
FIG. 3B is a block diagram of a further exemplary automated guided vehicle illustrating various controls

In embodiments, referring now to FIGS. 3A and 3B, controllable autonomous parts container base 100, 200, 300 comprises housing 330, controller 340 disposed at least partially within housing 330, one or more position sensors 350 operatively in communication with controller 340, each position sensor 350 operative to determine a coordinate location of housing 330 within defined two dimensional space 3 (FIG. 1) in real time without relying on a map stored in controller 340, one or more transceivers 360 operatively in communication with controller 340, and motive assembly 370 operatively in communication with controller 340, where motive assembly 340 is operative to move controllable autonomous parts container base 100, 200, 300 autonomously within the defined two dimensional space 3 under directives from controller 340 without the need for a map stored in controller 340.

Controller 340 may comprise one or more processors able to allow software executing in controller 340 to have controller 340 be operative to command various functions required by automated guided vehicles 1 such as via transceiver 360 and communicate with other entities, e.g. centralized supervisory system 500 via transceiver 501, automated guided vehicles 1, other systems such as inventory systems, and the like, or a combination thereof.

Position sensors 350 operate by sensing a current position of automated guided vehicle 1 along a grid deployed in two dimensional space 3.

Transceivers 360 are operatively in communication, typically bidirectional, between automated guided vehicles 1 and centralized supervisory system 500 such as via transceiver 501. They may also be in contact with one or more other automated guided vehicles 1 or the like.

Motive assembly 370 typically comprises an omnidirectional motive assembly and typically comprises two or more sets of wheels 372 or the like. Each motive assembly 370 is adapted to provide or respond to a set of navigation commands to its controllable autonomous parts container base 100,200,300 navigate that controllable autonomous parts container base 100,200,300 to an addressable parts container space 510 using an address for that addressable parts container space 510.

Part container identifiers 380 operatively in communication with controller 340 and operative to interrogate parts container identifier 421 to identify a parts container by its parts container identifier 421, e.g. bar codes (which can be optical), embedded chips, or the like, or a combination thereof.

Figure 4:
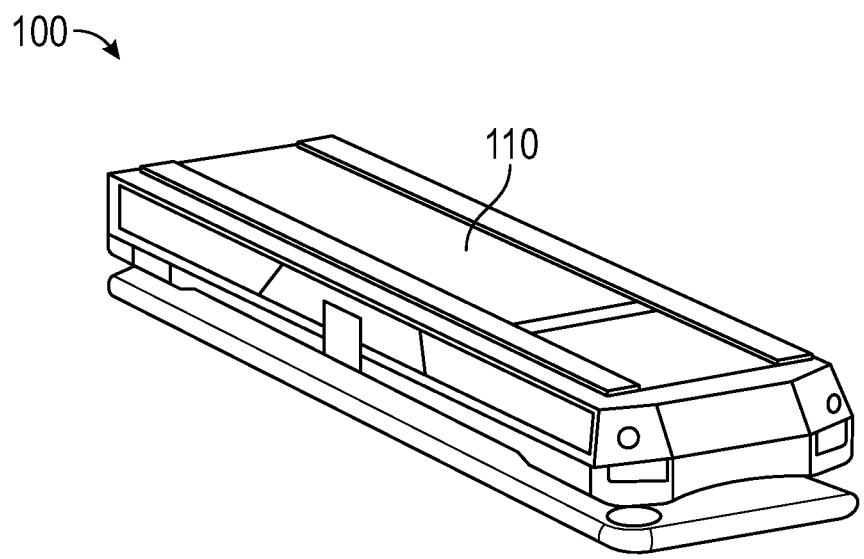
FIG. 4 is a view in partial perspective of a first exemplary automated guided vehicle.

Referring to FIG. 4, in the embodiment illustrated as controllable autonomous parts container base 100, controllable autonomous parts container base 100 comprises housing 330 (FIG. 3A).

Figure 5:
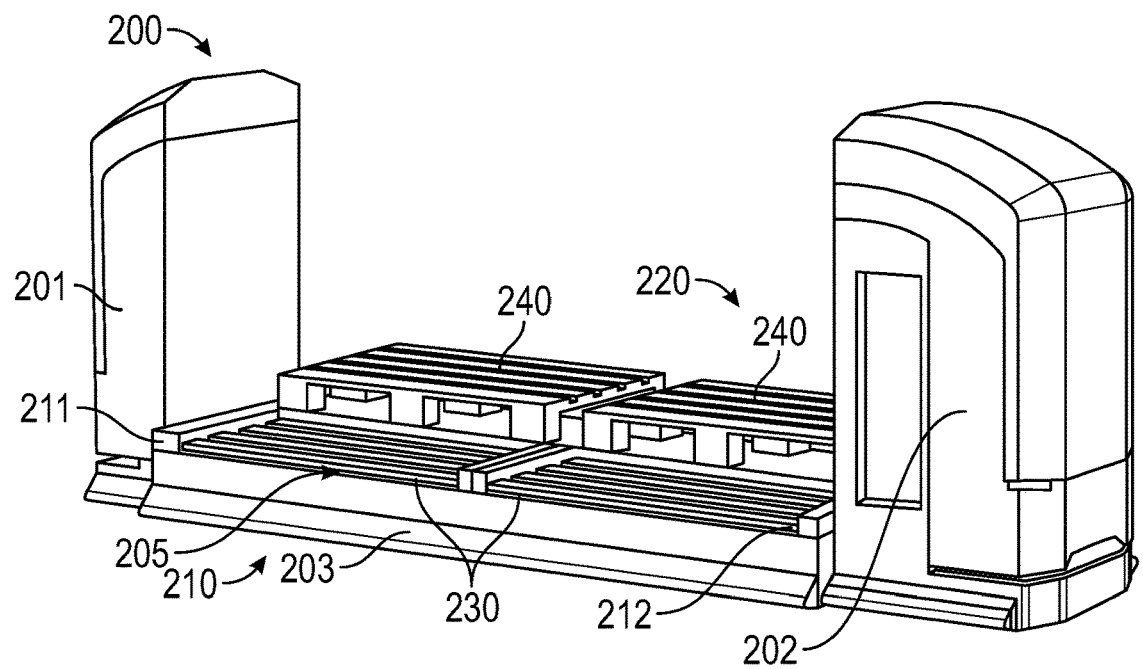
FIG. 5 is a view in partial perspective of a second exemplary automated guided vehicle.

Referring now to FIG. 5, as illustrated in other embodiments, e.g. controllable autonomous parts container base 200, controllable autonomous parts container base 200 may comprise housing 330 (FIG. 3A) as part of its base 203 or as part of an end piece such as 201 or 202. In this embodiment, part container storage space receiver 210 comprises first end 211 and second end 212 displaced from first end 211 along a horizontal axis of controllable autonomous parts container base 200. First end 211 and second end 212 define parts container 220. Selectively movable part container handler 230 may be present and disposed at least partially within parts container 220 where part container handler 230 may further be operatively in communication with controller 340 (FIG. 3A) and operative to move containers such as selectively removable pallet 240 along a vertical axis with respect to parts container 220 of controllable autonomous parts container base 200. Part container storage space receiver 210 is typically disposed about upper surface 205 of controllable autonomous parts container base 200 and may be further disposed proximate first end portion 202 of controllable autonomous parts container base 200 and/or intermediate first end 211 and second end 212.

Figure 6:
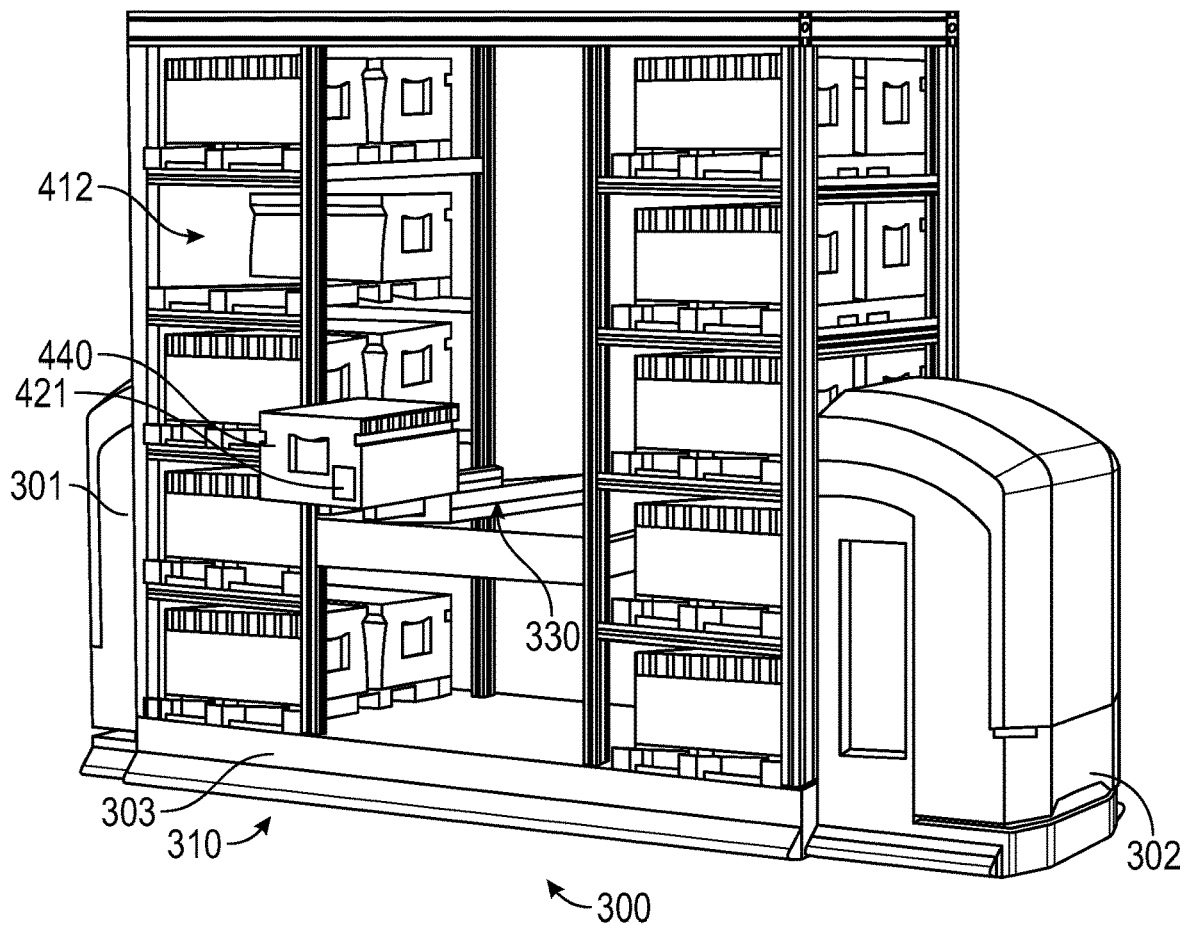
FIG. 6 is a view in partial perspective of a third exemplary automated guided vehicle.

In other embodiments, referring now to FIG. 6, controllable autonomous parts container base 300 may comprise housing 330 (FIG. 3B) as part of its base 303 or as part of an end piece such as 301 or 302. First end 301 and second end 302 of controllable autonomous parts container base 300 define part container storage space receiver 310 for selectively movable part container handler 400 disposed at least partially within part container storage space receiver 310 intermediate first end portion 301 and second end portion 302 of controllable autonomous parts container base 300. Part container storage space receiver 310 is typically disposed about an upper surface 305 (FIG. 3B) of controllable autonomous parts container base 300 and may be further disposed proximate first end portion 302 of controllable autonomous parts container base 300 and/or intermediate first end 301 and second end 302.

Part container handler 400 is typically operatively in communication with controller 340 (FIG. 3B) and operative to move itself and/or one or more part containers 440 which are selectively and removably disposed within a plurality of part container storage space receiver spaces 412. Parts container 440 may comprise parts container identifier 421. In these embodiments, part container handler 400 comprises part container handler 330 which is movable in at least two dimensions and commandable to select a specific part container 440 accepted into a specific part container storage space receiver space 412 of the plurality of part container storage space receiver spaces 412 and/or to allow receipt of a specific part container 440 into a specific part container storage space receiver space 412 of the plurality of part container storage space receiver spaces 412.

In the operation of exemplary embodiments, referring again to FIG. 1, storage system 2 may be used to allow one or more autonomous guided vehicles 1 to go out into two dimensional space 3, such as a warehouse floor or other item storage area, and retrieve one or more parts containers 440, or one or more parts from one or more parts containers 440, or other similar objects, and bring the retrieved containers and/or parts to a requesting entity such as a user at a work station. As used herein a user may be a human user or, e.g., a robot such as on an assembly line.

Although an exemplary two dimensional space 3 is a warehouse floor, such is not a limitation. By way of example and not limitation, two dimensional space 3 may comprise an office environment where autonomous guided vehicle 1 might deliver office mail or office supplies; a light industrial space, e.g. delivering parts containers 440 to various workstations; an industrial factory setting where autonomous guided vehicle 1 is reloading parts hoppers from a warehouse or delivering on-time parts to assembly line workers and/or robots (e.g. an auto assembly line); a standard roadway where autonomous guided vehicle 1 may be used to deliver mail or packages/parcels; a cargo transfer points to move packages from one transport to another in a cargo transit station (e.g. a post office, cargo terminal, or other package transfer station); a retail establishments where autonomous guided vehicle 1 may be used to stock and/or restock goods by transferring stock from a store's back warehouse to retail shelves or to re-shelve books in a library; or the like; or a combination thereof.

One or more such autonomous guided vehicles 1 may be part of storage system 2, and, if a plurality is present, the plurality of autonomous guided vehicles 1 may comprise a mix of autonomous guided vehicles 1 which further comprise a mix of controllable autonomous parts container bases 100, 200, and 300. In embodiments, autonomous guided vehicles 1 can retrieve multiple objects in one trip into two dimensional space 3.

As is described below, parts may be obtained from one or more parts bins 520 present in parts container storage space 510 of storage system 2, described above, by using an analytic software module operative in centralized supervisory system 500 to identify a vehicle opportunity to perform a required task, e.g. an optimal or other acceptable autonomous guided vehicle 1 to retrieve an item or return an item or perform a predetermined set of inventory functions or the like, and optimize selection of an autonomous guided vehicle 1 for the required task. Selection criteria can include capacity of such autonomous guided vehicles 1, current location of autonomous guided vehicles 1, current tasking for autonomous guided vehicles 1, and the like, or a combination thereof.

A vehicle selection optimization module is then used to notify the identified controllable autonomous guided vehicle 1 of its selection for the required task and the vehicle positioning module used to provide the identified, selected controllable autonomous guided vehicle 1 with an address for the appropriate addressable parts container storage space 510 within two dimensional space 3, the address defining a destination location within two dimensional space 3, and with a set of commands related to a specific parts bin 520 which comprises part bin identifier 521 associated with the required task.

The identified controllable autonomous guided vehicle 1 is allowed to then navigate, typically autonomously, to the addressable parts container space 512 comprising the address using motive assembly 370 of the identified controllable autonomous guided vehicle 1. Once it has arrived at the address, the identified controllable autonomous guided vehicle 1 uses its selectively movable part container handler 230,330 to perform a specifically commanded operation with respect to the specific parts bin 520 which comprises part bin identifier 521 associated with the required task, typically automatically. This specifically commanded operation may comprise commanding selectively movable part container handler 230,330 to move to a position proximate parts bin 520 and verify that parts container 440 is the desired parts container 440 using, e.g., part container identifiers 380 and parts container 421. If verified, selectively movable part container handler 230,330 obtains parts container 440 from parts bin 520, and positions parts container 440 in part container storage space receiver space 412 or returns positions parts container 440 into position parts bin 520.

In its embodiments, using the vehicle positioning module to provide the identified controllable autonomous guided vehicle 1 with an address for an addressable parts container space 520 further comprises providing the identified controllable autonomous guided vehicle 1 with a plurality of addresses, each address being for a specific addressable parts container space 512 within two dimensional space 3 and providing the identified controllable autonomous guided vehicle 1 with a set of commands related to a plurality of specific parts containers 440, each specific parts container 440 located at a predetermined address of the plurality of addresses. The identified controllable autonomous guided vehicle 1 navigates to each addressable parts container space 512 of the plurality of addresses using motive assembly 370 of the identified controllable autonomous guided vehicle 1.

In certain embodiments, the identified controllable autonomous guided vehicle 1 is also provided one or more destination locations, e.g. return locations, within two dimensional space 3 that are associated with a predetermined set of specific parts containers of the plurality of specific parts containers 440. If a return or destination address has also been identified, e.g. by centralized supervisory system 500, the identified autonomous guided vehicle 1 is then allowed to autonomously navigate to one or more destination locations once a set of commands are completed, e.g. part containers 440 have been retrieved from and/or returned to parts bins 520.

In its embodiments, software executing in controller 340 (FIGS. 3A and 3B) typically operates independently of the storage system's safety functions, thereby maintaining the failsafe nature of storage system 2. Further, in embodiments, software executing in centralized supervisory system 500 oversees and controls the health and well-being of all automated guided vehicles 1 in storage system 2. By way of example and not limitation, monitoring may include taking an automated guided vehicle 1 out of normal operation and placing it into maintenance mode if a fault or other health and well-being issue is detected.

In embodiments, software operatively executable in centralized supervisory system 500 further comprises a timer module which may be used to perform a set of steps at a predetermined set of times.

By way of example and not limitation, using storage system 2 as described above, a user may want to build something at a workstation and may need one or more parts from multiple places in a warehouse to accomplish this task. The user identifies the needed parts and optionally identifies their respective parts bins. Alternatively, storage system 2 may identify the parts bins associated with the requested parts. Once identified and requests, storage system 2 instructs an identified, selected autonomous guided vehicle 1 to go out into warehouse floor 3, gather all of the requested parts, and brings the gathered parts to the user at the requested work station. As will be understood by a person of ordinary skill in automated parts retrieval systems, that which is gathered can be individual parts, parts bins 520, or the like, or a combination thereof.

As further described above, the identified, selected autonomous guided vehicle 1 or another autonomous guided vehicle 1 may be further programmed to return the individual parts, parts bins 520, or the like, or a combination thereof to warehouse floor 3 when the use is done with parts from retrieved parts bins 520.

In addition, autonomous guided vehicle 1 can be further programmed to bring parts throughout a construction process, e.g. it might be programmed in such a manner that it knows that the user will require parts from various bins after a defined time, e.g. 1 hour and 20 minutes after it has delivered parts in an earlier delivery. Using similar methodology, storage system 2 may be used to bring multiple part loads to multiple workstations throughout the day as assembly of various components goes on.

In certain embodiments, storage system 2 may comprise one or more autonomous guided vehicles 1 which can interface with warehouse inventory systems to assist in part tracking, i.e. what parts have been used, how many, and where a bin currently is located (if off at some workstation). By way of example and not limitation, autonomous guided vehicle 1 can be fitted with terminals or other interfaces by which access to an inventory control system may be obtained, e.g. through which users can interface with to update parts status, request parts, and the like.

The foregoing disclosure and description of the inventions are illustrative and explanatory. Various changes in the size, shape, and materials, as well as in the details of the illustrative construction and/or an illustrative method may be made without departing from the spirit of the invention.

The invention claimed is:

1. A method of obtaining a parts container from an addressable parts container storage space using a storage system comprising an automated guided vehicle, comprising:
   a. using an analytic software module operative in a centralized system supervisor to identify a vehicle opportunity to perform a required task and to optimize selection of an autonomous guided vehicle for the required task, the autonomous guided vehicle comprising:
      i. a controllable autonomous parts container base, comprising:
         1. a housing;
         2. a controller disposed at least partially within the housing;
         3. a position sensor operatively in communication with the controller, the position sensor operative to determine a coordinate location of the housing within a defined two-dimensional space in real time without relying on a map stored in the controller;

4. a transceiver operatively in communication with the controller; and
5. a motive assembly operatively in communication with the controller, the motive assembly operative to move the controllable autonomous parts container base autonomously within the defined two-dimensional space under directives from the controller without the need for a map stored in the controller; and
  ii. a part container storage space receiver disposed about predefined portion of the controllable autonomous parts container base, the part container storage space receiver operatively in communication with the controller and configured to selectively and removably accept a parts container therein;
b. using a vehicle selection optimization module operative in the centralized system supervisor to notify the identified controllable autonomous guided vehicle of its selection for the task;
c. using a vehicle positioning module to provide the identified controllable autonomous guided vehicle with an address of an individually addressable parts container storage space within a two: dimensional space and with a set of commands related to the required task and related to a specific separately individually addressable parts container storage space, the separately individually addressable parts container storage space comprising a separately individually addressable parts container space adapted to receive a parts bin comprising a separately individually addressable part container identifier;
d. providing the identified controllable autonomous guided vehicle with a destination location within the two-dimensional space;
e. allowing software executing in the controller to allow the identified controllable autonomous guided vehicle to navigate to the specific separately individually addressable parts container storage space within the two-dimensional space comprising the address using the motive assembly of the identified controllable autonomous guided vehicle;
f. allowing software executing in the controller to allow the identified controllable autonomous guided vehicle to use its selectively movable part container handler to perform a specifically commanded operation on a parts bin disposed within the identified addressable parts container space which comprises the parts bin comprising the part container identifier; and
g. allowing software executing in the controller to cause the identified controllable autonomous guided vehicle to navigate to the destination location within a two-dimensional space in real time without relying on a map stored in the controller.

2. The method of obtaining a parts container from a parts container storage space using the storage system comprising an automated guided vehicle of claim 1, further comprising executing software in the controller independently of the storage system's safety functions, thereby maintaining a failsafe nature of the storage system.

3. The method of obtaining a parts container from a parts container storage space using the storage system comprising an automated guided vehicle of claim 1, further comprising executing software in the controller to oversee and control health and well-being of all automated guided vehicles in the storage system.

4. The method of obtaining a parts container from a parts container storage space using the storage system comprising an automated guided vehicle of claim 1, further comprising taking an automated guided vehicle out of normal operation and placing the automated guided vehicle into maintenance mode.

5. The method of obtaining a parts container from a parts container storage space using the storage system comprising an automated guided vehicle of claim 1, wherein the autonomous guided vehicle comprises a plurality of autonomous guided vehicles and the optimized selection is of an autonomous guided vehicle of the plurality of autonomous guided vehicles.

6. The method of obtaining a parts container from a parts container storage space using the storage system comprising an automated guided vehicle of claim 1, wherein the set of commands related to the required task and related to the specific separately individually addressable parts container storage space comprises commanding the selectively movable part container handler to move to a position proximate the separately individually addressable parts container space obtain the parts bin disposed within the separately individually addressable parts container space, and position the obtained parts bin in the parts container storage space receiver.

7. The method of obtaining a parts container from a parts container storage space using the storage system comprising an automated guided vehicle of claim 1, wherein:
a. using the vehicle positioning module to provide the identified controllable autonomous guided vehicle with the address for an individually addressable parts container storage space within the two-dimensional space and with the set of commands related to the required task and related to the specific separately individually addressable storage space further comprises:
  i. providing the identified controllable autonomous guided vehicle with a plurality of addresses, each address being for a specific addressable parts container storage space within the two-dimensional space; and
  ii. providing the identified controllable autonomous guided vehicle with a set of commands related to a plurality of specific parts bins, each specific parts bins located at a predetermined address of the plurality of addresses; and
b. allowing the identified controllable autonomous guided vehicle to navigate to an addressable parts container storage space comprising the address using the motive assembly of the identified controllable autonomous guided vehicle further comprises allowing the identified controllable autonomous guided vehicle to navigate to each addressable parts container space of the plurality of addresses.

8. The method of obtaining a parts container from a parts container storage space using the storage system comprising an automated guided vehicle of claim 1, wherein:
a. providing the identified controllable autonomous guided vehicle with a destination location within a two-dimensional space further comprises providing the identified controllable autonomous guided vehicle with a set of destination locations; and
b. allowing the identified controllable autonomous guided vehicle to navigate to the destination location within a two-dimensional space further comprises allowing the identified controllable autonomous guided vehicle to navigate to a specific destination location of the set of destination locations, each destination location of the set of destination locations being associated with a predetermined set of specific parts containers of the plurality of specific parts containers.

9. The method of obtaining a parts container from a parts container storage space using the storage system comprising an automated guided vehicle of claim 1, wherein the software operatively executable in the controller further comprises a timer module, the method further comprising using the timer module to perform a set of steps at a predetermined set of times.

10. The method of obtaining a parts container from a parts container storage space using the storage system comprising an automated guided vehicle of claim 1, further comprising using the identified controllable autonomous guided vehicle to perform a predetermined set of inventory functions.

11. The method of obtaining a parts container from a parts container storage space using the storage system comprising an automated guided vehicle of claim 1, wherein:
   a. the automated guided vehicle further comprises a position sensor operatively in communication with the controller, the position sensor operative to determine a coordinate location of the housing within the two-dimensional space in real time without relying on a map stored in the controller; and
   b. allowing software executing in the controller to allow the identified controllable autonomous guided vehicle to navigate to the specific separately individually addressable parts container storage space within the two-dimensional space further comprises navigating to the specific separately individually addressable parts container storage space within the two-dimensional space in real time without relying on a map stored in the controller.

\* \* \* \* \*